US011585509B2

(12) United States Patent
Albou et al.

(10) Patent No.: US 11,585,509 B2
(45) Date of Patent: Feb. 21, 2023

(54) LIGHTING SYSTEM OF AN AUTOMOTIVE VEHICLE HAVING HIGH AND LOW RESOLUTION PIXELATED BEAMS

(71) Applicant: VALEO VISION, Bobigny (FR)

(72) Inventors: Pierre Albou, Bobigny (FR); Sophie Clade, Bobigny (FR); Taro Nishio, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/426,218

(22) PCT Filed: Jan. 30, 2020

(86) PCT No.: PCT/EP2020/052363
§ 371 (c)(1),
(2) Date: Jul. 28, 2021

(87) PCT Pub. No.: WO2020/157241
PCT Pub. Date: Aug. 6, 2020

(65) Prior Publication Data
US 2022/0099268 A1   Mar. 31, 2022

(51) Int. Cl.
*F21S 41/663*   (2018.01)
*B60Q 1/14*   (2006.01)

(52) U.S. Cl.
CPC .......... *F21S 41/663* (2018.01); *B60Q 1/1423* (2013.01); *B60Q 2300/054* (2013.01);
(Continued)

(58) Field of Classification Search
CPC .. F21S 41/663; F21S 41/153; B60Q 2300/40; B60Q 2300/41; B60Q 2300/42; B60Q 2300/43; B60Q 2300/45; B60Q 2300/47
See application file for complete search history.

(56) References Cited

U.S. PATENT DOCUMENTS 6,822,563 B2 * 11/2004 Bos .................. H04N 5/335
348/42
8,292,481 B2   10/2012 Gotz et al.
(Continued)

FOREIGN PATENT DOCUMENTS

DE   102007052745 A1   5/2009
DE   102017129254 A1   7/2018
(Continued)

OTHER PUBLICATIONS

European Patent Office, International Search Report and Written Opinion of corresponding PCT Application No. PCT/EP2020/052363, dated Apr. 1, 2020.
(Continued)

*Primary Examiner* — Robert J May
(74) *Attorney, Agent, or Firm* — Valeo Vision

(57) ABSTRACT

The present invention relates to a lighting system for a motor vehicle. The lighting system comprises at least one first light emitting device mounted on a front right side of the vehicle and adapted to project in front of the vehicle a first pixelated light beam. The lighting system further comprises at least one second light emitting device mounted on a front left side of the vehicle and adapted to project in front of the vehicle a second pixelated light beam. One of the first pixelated light beam and second pixelated light beam, called high resolution beam, has a number of pixels greater than or equal to at least five times, in particular greater than or equal to at least ten times, the number of pixels of the other of said pixelated light beams, called low resolution beam.

19 Claims, 4 Drawing Sheets

(52) U.S. Cl.
CPC ...... *B60Q 2300/42* (2013.01); *B60Q 2300/45* (2013.01); *B60Q 2400/50* (2013.01)

(56) References Cited

U.S. PATENT DOCUMENTS

| | | | |
|---|---|---|---|
| 10,336,242 B2 * | 7/2019 | Canonne | ................ B60K 37/06 |
| 10,598,330 B2 | 3/2020 | Mayer et al. | |
| 10,641,454 B2 | 5/2020 | Kikuchi et al. | |
| 2006/0239024 A1 | 10/2006 | Valcamp et al. | |
| 2008/0239746 A1 | 10/2008 | Wuller et al. | |
| 2015/0377442 A1 | 12/2015 | Bhakta et al. | |
| 2018/0372295 A1 | 12/2018 | Kikuchi et al. | |

FOREIGN PATENT DOCUMENTS

| | | |
|---|---|---|
| DE | 102018105563 A1 | 9/2018 |
| DE | 102017206274 A1 | 10/2018 |
| DE | 102018210107 A1 | 12/2018 |
| EP | 2772682 A2 | 9/2014 |
| EP | 3401838 A1 | 11/2018 |
| FR | 1306770 A | 10/1962 |
| JP | 2008537315 A | 9/2008 |
| JP | 2014165130 A | 9/2014 |
| JP | 2015118833 A | 6/2015 |
| JP | 2015230768 A | 12/2015 |
| JP | 2016105386 A | 6/2016 |
| JP | 2019507950 A | 3/2019 |
| WO | 2016093154 A1 | 6/2016 |

OTHER PUBLICATIONS

Japanese Patent Office, Office Action (with English translation) for corresponding Japanese application No. 2021-544560, dated Sep. 27, 2022.

Japanese Patent Office, Search Repod for corresponding Japanese application No. 2021-544560, dated Sep. 14, 2022.

* cited by examiner

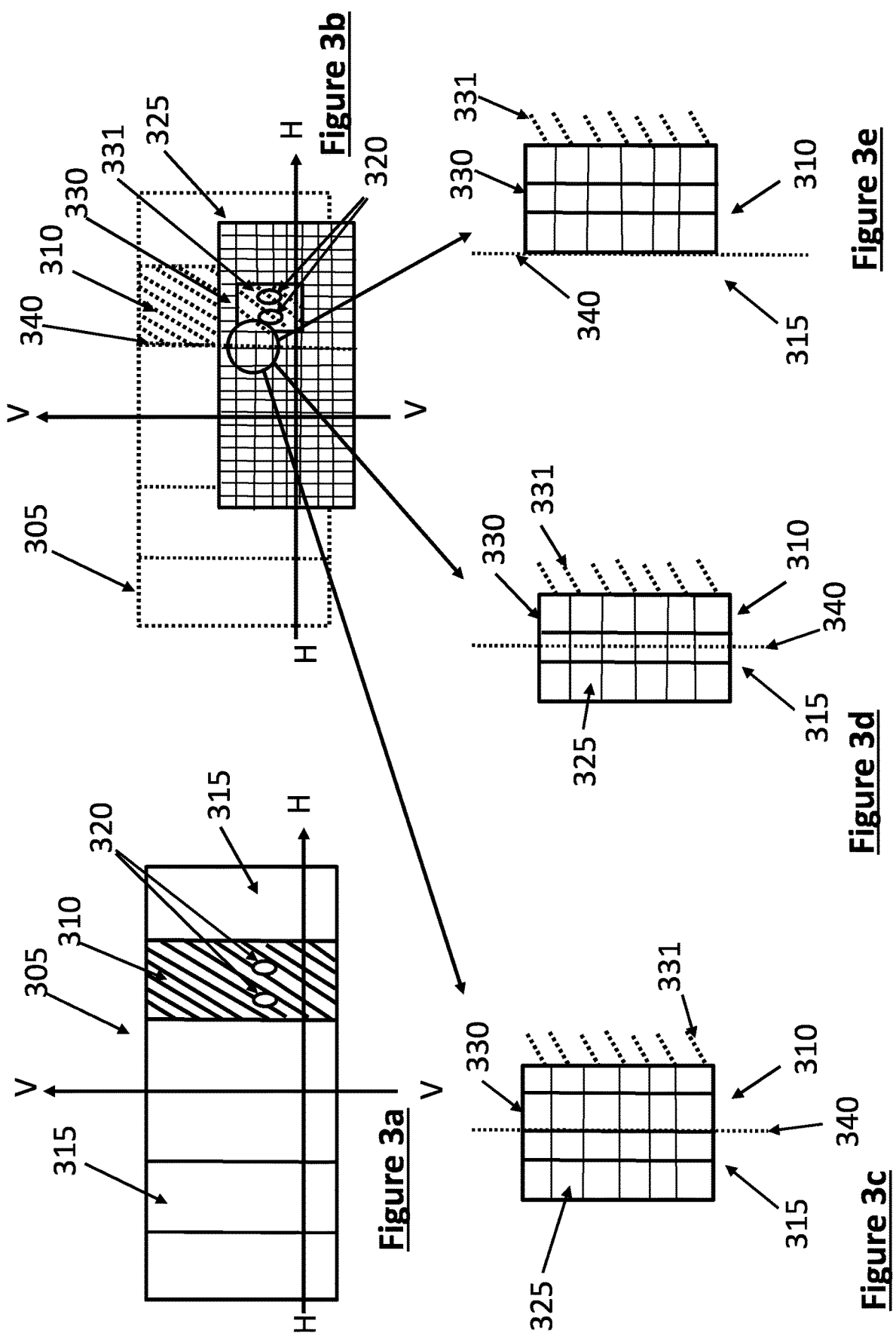

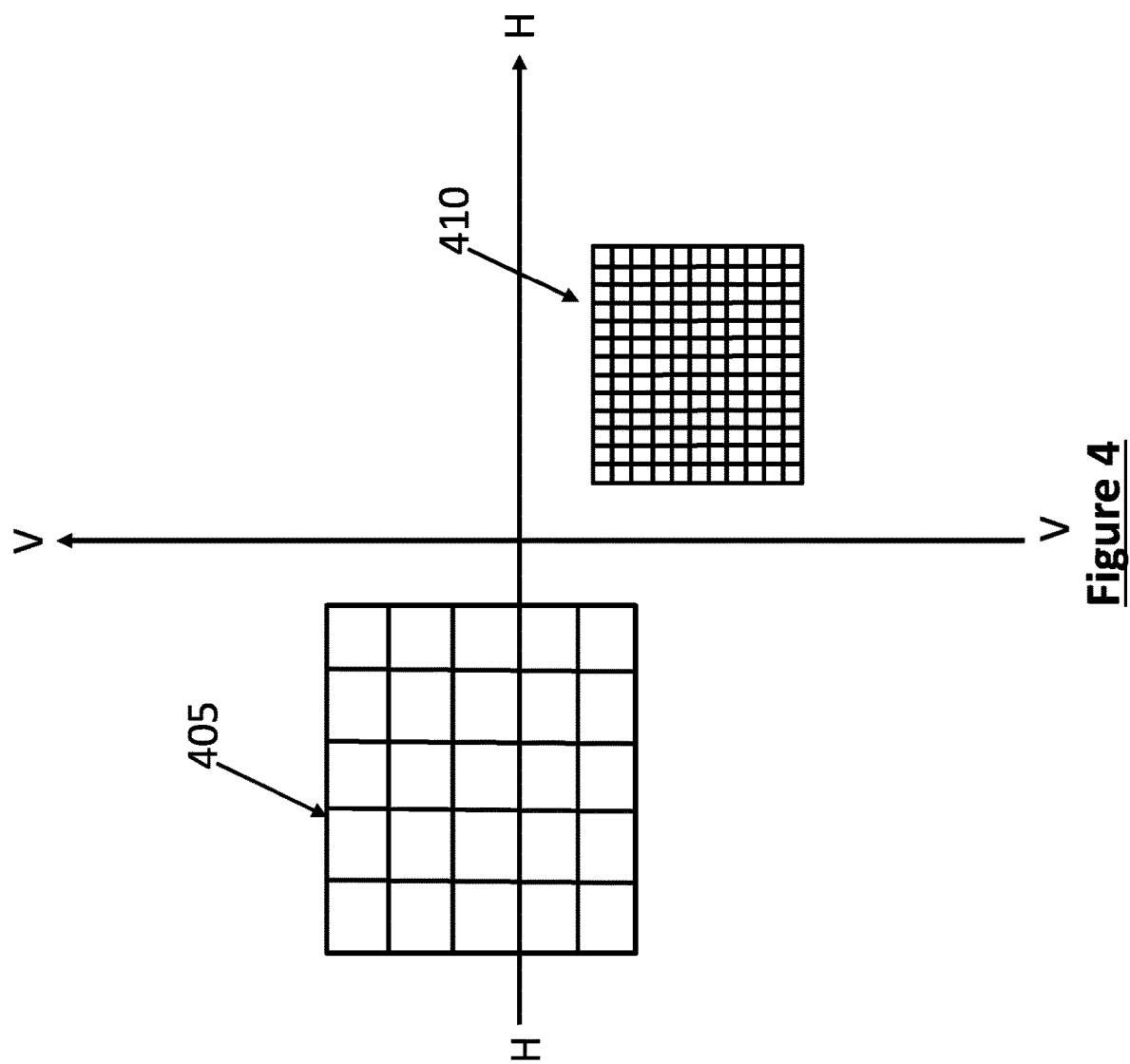

LIGHTING SYSTEM OF AN AUTOMOTIVE VEHICLE HAVING HIGH AND LOW RESOLUTION PIXELATED BEAMS

CROSS REFERENCE TO RELATED APPLICATIONS

This is a 371 application (submitted under 35 U.S.C. § 371) of International Application No. PCT/EP2020/052363 (WO2020157241) filed on Jan. 30, 2020, which claims the priority date benefit of European Application No. EP19155158.9 filed on Feb. 1, 2019, the disclosures of which are hereby incorporated by reference in their entirety.

TECHNICAL FIELD

The present invention relates to a lighting system for a vehicle, and more particularly, to a frontal headlamps for a vehicle

BACKGROUND

A motor vehicle is equipped with frontal headlamps for illuminating in front of the motor vehicle. The frontal headlamps are configured to be mounted on right and left portions of the front side of the vehicle. Each headlamp includes at least one light emitting device on its front right and at least one light emitting device on its front left. The right and the left are here defined with respect to the normal direction of circulation of the vehicle and for a user seated in the driving position. These light emitting devices are adapted to emit in particular light beams of low beam and/or high beam type, and daylight-like signaling beams, also called DRL (for "daytime running lamp"), position lamp, or direction indicator lamp.

In addition to the beams described above, these light emitting devices are more and more frequently adapted to project advanced functions in front of the vehicle. Recent developments in the field of these light devices make it possible to produce a pixelated light beam to project advanced functions. A pixelated light beam is in known manner a light beam subdivided into elementary light sub-beams called "pixels". With such pixelated light beam, the light device can also perform localized lighting functions, for example projecting a pattern on the stage. Such functions are known in the field of adaptive lighting. For example, glare free lighting is known by darkening an area corresponding to a vehicle coming from the front so as not to dazzle this other user. Another example is the vehicle driving in front of the equipped vehicle, in the same direction. In this case, the purpose of this kind of lighting is to avoid glaring the user through reflections on the side mirrors or internal mirror by darkening the corresponding area. Driving lighting is also known, for example by intensifying the markings on the ground or road signs so that they are more visible to the driver and/or projecting on the road one or more visible information of the driver.

However, such devices capable of generating advanced functions have a very high cost. Moreover, they generally have an increased power consumption. Finally, the high precision of the beams that they generate makes a careful and complex alignment necessary, which increases the cost even more.

SUMMARY

An object of the present invention is to solve the disadvantages described above of known lighting systems of a motor vehicle. In particular, it is the object of the present invention to provide a lighting system that can project two different pixelated beams having low and high resolutions, such that the lighting system can effectively perform advanced lighting functions while meeting the required luminous intensity for the vehicle.

Other object of the present invention is to provide a lighting system of lesser cost compared to conventional light systems, which projects same resolution type of pixelated light beams from both the frontal headlamps.

Another object of the present invention is to provide a lighting system, which consumes lesser power compared to conventional light systems.

According to one non-limiting embodiment of the present invention, there is provided a lighting system of a motor vehicle comprising at least one first light emitting device adapted to be mounted on a front right side of the vehicle and adapted to project in front of the vehicle a first pixelated light beam. The lighting system further comprises at least one second light emitting device adapted to be mounted on a front left side of the vehicle and adapted to project in front of the vehicle a second pixelated light beam. One of the first pixelated light beam and the second light beam, called high resolution beam, has a number of pixels greater than or equal to at least three times the number of pixels of the other of said pixelated light beams, called low resolution beam.

According to one non-limiting embodiment of the present invention, one of the first pixelated light beam and the second light beam, called high resolution beam, has a number of pixels greater than or equal to at least five times, in particular greater than or equal to at least ten times, the number of pixels of the other of said pixelated light beams, called low resolution beam.

Preferably, the first light emitting device is adapted to be mounted only on a front right side of the vehicle and second light emitting device adapted to be mounted only on a front left side of the vehicle. In other words, the lighting system comporting the first and second light emitting devices comprises only a light emitting device adapted to project the high resolution beam on one side and no light emitting device adapted to project the low resolution beam on the same side, and only a light emitting device adapted to project the low resolution beam on the other side and no light emitting device adapted to project the high resolution beam on this same other side. Then, as the light emitting device adapted to project the high resolution beam is only on one side of the pair of light emitting devices, generally right and left headlamps, of the light emitting system to be mounted on the vehicle, the global cost of the lighting system is reduced.

According to one non-limiting embodiment of the present invention, the low resolution beam covers a larger luminous field than the high resolution beam.

According to one non-limiting embodiment of the present invention, the low resolution beam extends horizontally over a wider angular field than the high resolution beam.

According to one non-limiting embodiment of the present invention, the low resolution beam extends vertically higher than the high resolution beam.

According to one non-limiting embodiment of the present invention, the high resolution beam extends vertically lower than the low resolution beam.

According to one non-limiting embodiment of the present invention, the low resolution beam presents a higher luminous intensity maximum than the high resolution beam.

According to one non-limiting embodiment of the present invention, the lighting system comprises a control module of the at least one first light emitting device and the at least second light emitting device, adapted to selectively control the switching ON and OFF of the pixels of the first pixelated light beam and the second pixelated light beam.

According to one non-limiting embodiment of the present invention, the first pixelated light beam and the second pixelated light beam overlap at least partially.

According to one non-limiting embodiment of the present invention, the control module is adapted to switch ON at least one pixel of the high resolution beam inside an area corresponding to at least one switched OFF pixel of the low resolution beam.

According to one non-limiting embodiment of the present invention, the at least one switched ON pixel of the high resolution beam is contiguous to or overlaps an edge of one switched ON pixel of the low resolution beam.

According to one non-limiting embodiment of the present invention, first light emitting device and the second light emitting device are adapted to project in front of the vehicle a dark area corresponding to a vehicle, pedestrian or like coming from the front, or being positioned in the front. In other words, first light emitting device and the second light emitting device are adapted to project in front of the vehicle a glare free high beam so as not to dazzle this other user.

According to one non-limiting embodiment of the present invention, the first pixelated light beam and the second pixelated light beam are disjointed from each other.

According to one non-limiting embodiment of the present invention, the high resolution beam extends vertically lower than the low resolution beam.

According to one non-limiting embodiment of the present invention, the high resolution beam and the low resolution beam are arranged laterally to each other.

According to one non-limiting embodiment of the present invention, first light emitting device and the second light emitting device are adapted to perform a road surface drawing functions. For example, the road surface drawing functions include projecting in front of the vehicle at least one of images, patterns, logos, drawings, symbols, characters and/or like on a road surface.

According to one non-limiting embodiment of the present invention, the light emitting device adapted to project in front of the vehicle the low resolution beam is mounted on the same side of the vehicle where the steering wheel is located, and the light emitting device adapted to project in front of the vehicle the high resolution beam is mounted on the other side of the vehicle. It allows to reduce the cost of a damage that may be caused during accidents. Further, by mounting the light emitting device projecting high resolution beam on the other side of the vehicle, the probability of the expensive light emitting device to be impacted is reduced According to one non-limiting embodiment of the present invention, there is provided an automotive vehicle comprising a lighting system according to the invention.

According to one non-limiting embodiment of the present invention, there is provided an automotive vehicle having a lighting system according to the invention, which includes at least one first light emitting device, and at least one second light emitting device to project low resolution beam and the high resolution beam.

According to one non-limiting embodiment of the present invention, the motor vehicle comprises at least one first light emitting device mounted on a front right side of the vehicle and adapted to project in front of the vehicle a first pixelated light beam and at least one second light emitting device mounted on a front left side of the vehicle and adapted to project in front of the vehicle a second pixelated light beam, one of the first pixelated light beam and the second light beam, called high resolution beam, having a number of pixels greater than or equal to at least five three times, in particular greater than or equal to at least ten times, the number of pixels of the other of said pixelated light beams, called low resolution beam.

According to one non-limiting embodiment of the present invention, the light emitting device adapted to project in front of the vehicle the low resolution beam is mounted on the same side of the vehicle where the steering wheel is located, and the light emitting device adapted to project in front of the vehicle the high resolution beam is mounted on the other side of the vehicle.

Thus, by providing a lighting system, which can project two different pixelated light beams of low and high resolutions from the right and left side of the frontal headlamps, cost and power consumption of the lighting system can be reduced while achieving a required luminous intensity for the vehicle.

BRIEF DESCRIPTION OF THE DRAWINGS

To complete the description and to provide a better understanding of the invention, a set of drawings is provided. Said drawings form an integral part of the description and illustrate an embodiment of the invention, which should not be construed as restricting the scope of the invention, but only as an example of how the invention can be carried out. The drawings comprise the following characteristics.

FIG. 3a and FIG. 3b show schematic views of illumination regions formed by low and high resolution beams, according to an embodiment of the present invention.

FIG. 3c, FIG. 3d, and FIG. 3e show enlarged portions of a circular area indicated in the FIG. 3b, according to an embodiment of the present invention.

FIG. 4 shows schematic view of an illumination region formed by low and high resolution beams, according to another embodiment of the present invention.

DETAILED DESCRIPTION OF THE INVENTION

Hereinafter, embodiments of the present invention will be described with reference to the accompanying drawings.

According to an embodiment of the present invention, a lighting system comprises a pair of frontal headlamps. The pair of frontal headlamps are configured to be mounted on right and left sides of a front portion of a vehicle. The lighting system can realize a global illumination function on at least a portion of the scene, which is the vehicle environment, may be illuminated by the lighting system. The part of the well lit by the global lighting scene may be a driving field of view, made visible or more visible to the driver to assist him or allow him driving. The overall lighting can thus be for example a high beam function or a function of low beam.

Each frontal headlamp includes at least one light emitting device. One of the headlamp may include at least one first light emitting device to produce a first pixelated light beam and other headlamp may include at least one second light emitting device to produce a second pixelated light beam. The first pixelated light beam and the second pixelated light beam comprises a plurality of pixels extending either in one direction (horizontal or vertical) or extending in both the horizontal and vertical directions.

Figure 1:
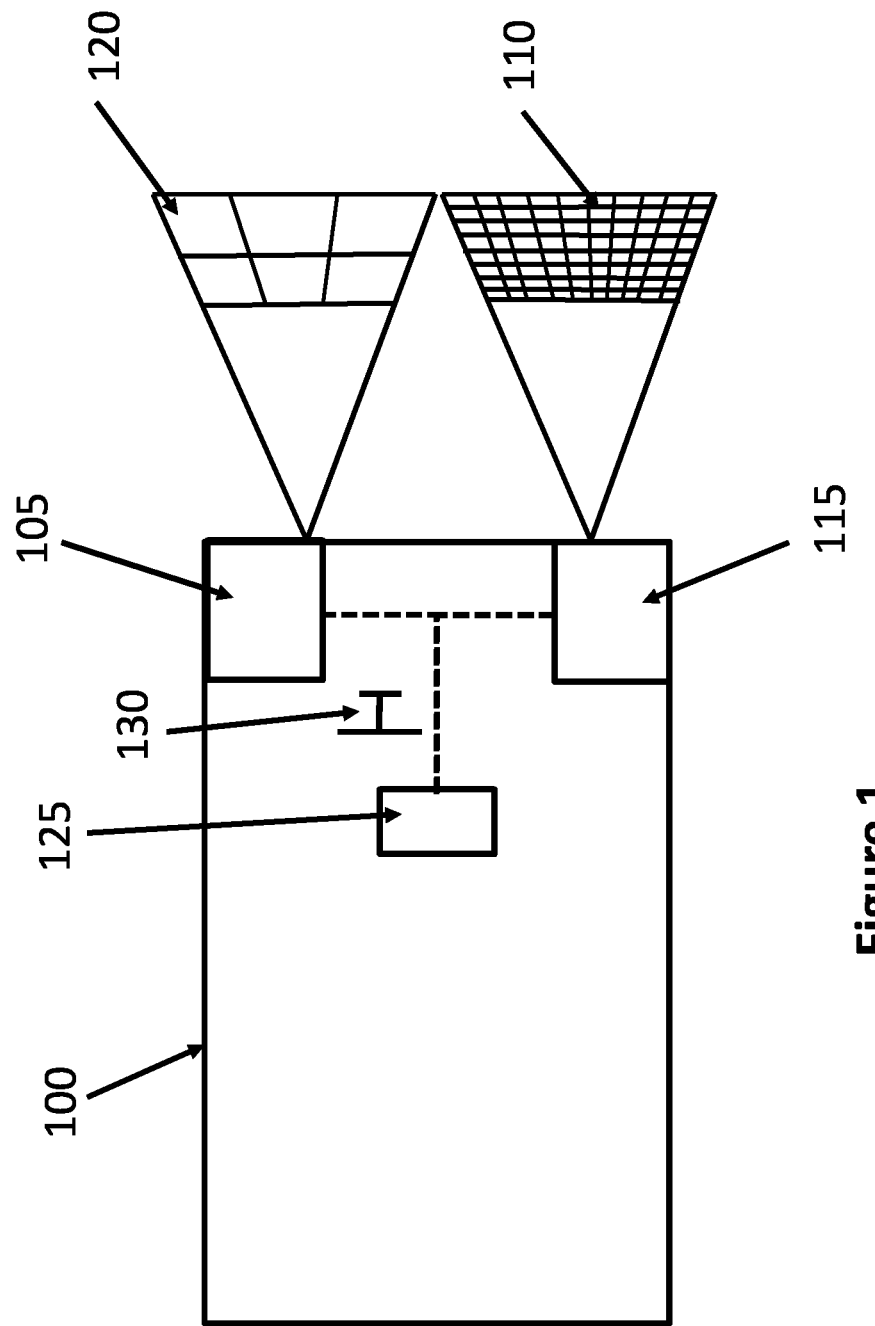
FIG. 1 shows a schematic top view of an automotive vehicle comprising light emitting devices, according to an embodiment of the present invention.

FIG. 1 shows a schematic top view of an automotive vehicle 100 comprising light emitting devices, according to an embodiment of the present invention. The vehicle 100 comprises a lighting system having a pair of frontal headlamps. The pair of frontal headlamps are configured to be mounted on right and left sides of a front portion of a vehicle 100. As can be seen from the FIG. 1, the lighting system comprises at least one first light emitting device 105 mounted on a front left side of the vehicle 100 and adapted to project in front of the vehicle a first pixelated light beam 120. The lighting system further comprises at least one second light emitting device 115 mounted on a front right side of the vehicle 100 and adapted to project in front of the vehicle a second pixelated light beam 110.

The lighting system further includes a control module 125 coupled to the at least one first light emitting device 105 and the at least one second light emitting device 115. The control module 125 can thus control generating and/or the projection of the pixelated light beams 110, 120. In an aspect, the control module 125 can be integrated to the light device, i.e., headlamp, in particular in one of the right and left headlamps. The control module 125 may include a processor (or CPU acronym for "Central Processing Unit", literally "CPU") coupled with a memory on which is stored a computer program which includes instructions enabling the processor to perform steps generating signals for controlling the light source. The control module 125 thus may for example individually control the light emission of each pixel.

In an embodiment, one of the first pixelated light beam 120 and second pixelated light beam 110, called high resolution beam, has a number of pixels greater than or equal to at least five times, in particular greater than or equal to at least ten times, the number of pixels of the other of said pixelated light beams, called low resolution beam. In this example, 120 is the low resolution beam and 110 is the high resolution beam.

In an embodiment, the low resolution beam covers a larger luminous field than the high resolution beam.

A pixelated light beam may be projected by the vehicle headlamp or a lighting device comprising a light source, i.e., at least one light emitting device. The light source may be adapted to cooperate with an optical system (integrated in the device or not) arranged to project on the road a pixelated light beam emitted by the light source. The same light source can emit global illumination and image. In one specific embodiment, the light source is divided into several units of individually controllable light sources. Each pixel emitted by the light source, and thus each light source unit may correspond to one pixel of the light beam projected pixelated. Thus, the light intensity of each pixel of the light source and thus the illumination of each pixel of the scene can be individually controlled.

In an embodiment, the at least one first light emitting device or the at least one second light emitting device comprises a so called matrix beam module for producing a matrix beam, which is a kind of glare free high beam. Projected on a virtual vertical screen disposed at the front of the vehicle 100, for example at a distance of 25 meters from the front of the vehicle, the matrix beam comprises a plurality of segments arranged in a row. Known recent matrix beam modules comport one or several light source(s), especially semiconductor light source(s), and an optical system comprising one or several reflector(s), one or several lense(s), one or several light guide(s), or a combination of reflector(s), lens(es), and/or light guide(s). Typical angular extension is about +/−20° horizontally from an optical axis of the module. Typically, the beam comprises between 4 and 20 segments. Such a module is designated by matrix beam module in the present application.

In an embodiment, the at least one first light emitting device or the at least one second light emitting device comprises a so called pixel beam module for producing a pixel beam. The pixel beam comprises a plurality of pixels arranged in matrix comprising at least two rows and two columns, at least one row being in the high beam zone. In addition, the size of the pixels can be smaller compared to the segments of the matrix beam, which allows a better resolution of the beam. The width and/or height of the pixels can change within one row, or between the rows. Known recent pixel beam modules comport one or several light source(s), especially semiconductor light source(s), and an optical system comprising one or several reflector(s), one or several lense(s), one or several light guide(s), or a combination of reflector(s), lens(es), and/or light guide(s). Such a module is designated by pixel beam module in the present application.

In an embodiment, the at least one first light emitting device or the at least one second light emitting device comprises a DMD (the acronym standing for "Digital Mirror Device") where the rotational modulation mirrors microphones provides a desired luminous intensity in a given direction.

In an embodiment, the at least one first light emitting device or the at least one second light emitting device comprises a LCD (acronym for "Liquid Crystal Displays") comprising a surface light source in front of which the liquid crystals are placed. The movement of the liquid crystals can allow or disallow the passage of light and thus forms pixelated light beam.

In an embodiment, the at least one first light emitting device or the at least one second light emitting device comprises a laser scan type mechanism for sending a light beam to a scanning system, which distributes it on the surface of a wavelength conversion device, such as a plate having a photoluminescent material.

In an embodiment, the at least one first light emitting device or the at least one second light emitting device comprises one or more light emitting sources. In one embodiment, the light emitting source is a light source solid state (standing for "solid-state lighting") which comprises at least one light emitting element. Examples include emitting element emitting diode or LED (acronym for "Light Emitting Diode"), organic light emitting diode or OLED (acronym for "Organic Light-Emitting Diode"), or a polymer LED or PLED (acronym for "Polymer Light-Emitting Diode"). The light emitting source may be a semiconductor light source. Each light emitting element or group of light emitting elements may form a pixel and can emit light when the material is supplied with electricity. The light emitting elements may each be semiconductor, that is to say they each have at least one semiconductor material.

In an embodiment, the light source of the at least one first light emitting device or the at least one second light emitting device comprises a solid-emitting monolithic conductor. The light source may for example be a monolithic matrix of pixels. The light source may for example be a monolithic matrix of LEDs. A monolithic matrix comprises at least 50 light emitting elements located on the same substrate (e.g.

on the same face of the substrate), for example more than 100, 1000 or thousands of light emitting elements.

Each above-mentioned technology provides different pixelated light beams having number of pixels and each pixel can be controlled based on the requirements. By way of an example, and not limitation, LCD, DMD and laser scan technologies can provide beams having pixels that are at least 5 to 10 times more than the number of pixels provided by monolithic light source technology. Further monolithic light source technology can provide beams having pixels that are at least 5 to 10 times more than the number of pixels provided by the pixel technology.

As previously mentioned, in accordance with the present invention, each frontal headlamp includes at least one light emitting device 105, 115 i.e., a light source. One of the headlamp may include at least one first light emitting device 105 to produce a first pixelated light beam 120 and other headlamp may include at least one second light emitting device 115 to produce a second pixelated light beam 110. The first pixelated light beam 120 and the second pixelated light beams 110 are of different resolutions. In an embodiment, one of the first pixelated light beam and the second pixelated light beam in high resolution beam, and other pixelated light beam is a high resolution beam. As mentioned above, in this example, 120 is the low resolution beam and 110 is the high resolution beam.

In an example, the at least one first light emitting device 105 comprises a matrix beam module as previously defined to generate and project a first pixelated light beam 120 and the at least one second light emitting device 115 comprises a DMD to generate and project a second pixelated light beam 110, or vice versa.

In another example, the at least one first light emitting device 105 comprises a matrix beam module to generate and project a first pixelated light beam 120 and the at least one second light emitting device 115 comprises a pixel beam module as previously defined to generate and project a second pixelated light beam 110, or, vice versa.

In another example, the at least one first light emitting device 105 comprise a monolithic light source to generate and project a first pixelated light beam 120 and the at least one second light emitting device 115 comprises a DMD to generate and project a second pixelated light beam 110, or, vice versa. For example, for left hand driven vehicles, left side headlamp may be mounted with monolithic light source and the right side headlamp is mounted with the DMD.

In another example, the at least one first light emitting device 105 comprises a matrix beam module to generate and project a first pixelated light beam 120 and the at least one second light emitting device 115 comprises a monolithic light source to generate and project a second pixelated light beam 110, or, vice versa. For example, for left hand driven vehicles, left side headlamp may be mounted with monolithic light source and the right side headlamp is mounted with matrix beam module.

For the purpose of understanding, only some of combinations of technologies are mentioned above. However, different combinations of technologies can be incorporated in the vehicle headlamps such that the low resolution beam and the high resolution beam can be projected from frontal headlamps.

Figure 2B:
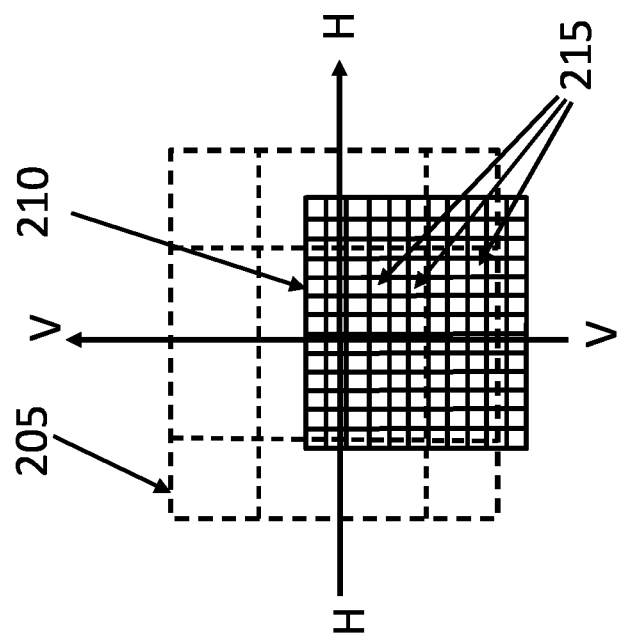
FIG. 2a and FIG. 2b show a projection of a low resolution beam and a high resolution beam on a virtual vertical screen placed in front of a vehicle, according to an embodiment of the present invention.
Figure 2A:
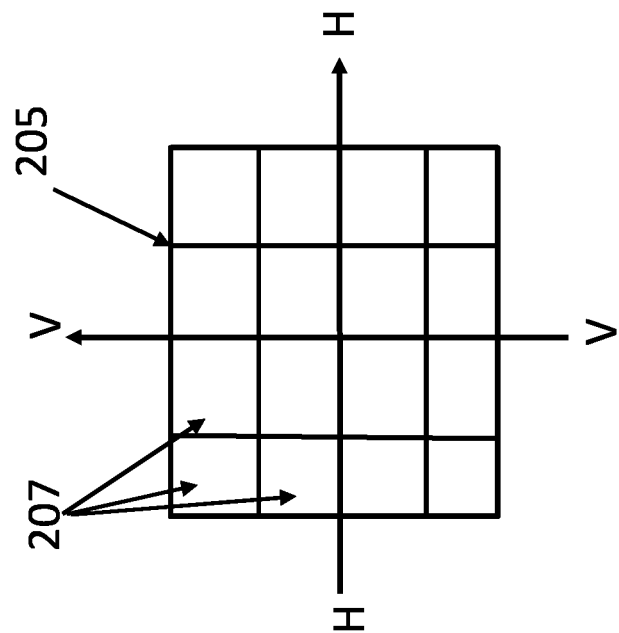

In an embodiment, in order to reduce the cost of damage that may be caused during accidents, the light emitting device adapted to project in front of the vehicle the low resolution beam may be mounted on the same side of the vehicle where the steering wheel 130 is located, and the light emitting device adapted to project in front of the vehicle the high resolution beam may be mounted on the other side of the vehicle. Further, by mounting the light emitting device projecting high resolution beam on the other side of the vehicle, the probability of this expensive light emitting device to be impacted is reduced FIG. 2a and FIG. 2b shows a projection of a low resolution beam and a high resolution beam on a virtual vertical screen placed in front of a vehicle, according to an embodiment of the present invention. In particular, FIG. 2a shows illumination region or a light distribution pattern formed by a projection of a low resolution beam on a virtual vertical screen disposed at the front of the vehicle 100. The distance of the screen to the lighting system may be chosen between 10 m and 50 m. For example the distance is 25 meters, or 100 feet. The screen can also be a portion of sphere, centered onto the lighting system. The radius of the sphere may have the same value as the distance described previously.

Reference number 205 in the FIG. 2a indicates an illumination region formed by the projection of the low resolution beam. In the example shown in the FIG. 2a, the low resolution beam 205 comprises 16 pixels 207. As can be seen from the FIG. 2a, pixels are arranged in matrix comprising 4 rows and 4 columns. In another examples the low resolution beam 205 could comport more or less than 16 pixels, and the pixels could be arranged in matrix have the same number, or different numbers, of rows and columns. Although the pixels shown in the FIG. 2a are of same size, it is understood to a person skilled in the art that pixels can be of different sizes in terms of width and/or height.

In an embodiment of the present invention, the first pixelated light beam 120 and the second pixelated light beam 115 overlap at least partially, which can be seen from the FIG. 2b. FIG. 2b shows a light distribution pattern formed by a projection of a high resolution beam and a low resolution beam on a virtual vertical screen disposed at the front of the vehicle 100, for example at a distance of 25 meters from the front of the vehicle. Reference number 210 in the FIG. 2b indicates an illumination region formed by the by the projection of the high resolution beam having high resolution beam pixels 215, and the trace of the low resolution beam is indicated by the reference numeral 205. Dotted lines in the FIG. 2b corresponds to the trace of the low-resolution beam.

The projection of the low beam and high beams are shown with respect to the horizontal axis (H) and vertical axis (V). The crossing point of the horizontal axis and the vertical axis i.e., center of the projected beams corresponds to an optical axis of the vehicle headlamp.

As can be seen from the FIG. 2b, the low resolution beam 205 extends horizontally over a wider angular field than the high resolution beam 210. Further, as can be seen from the FIG. 2b, the low resolution beam 205 extends vertically higher than the high resolution beam 210, i.e., upper edge of the low resolution beam 205 is higher than the upper edge of the high resolution beam 210. Further, as can be seen from the FIG. 2b, the high resolution beam 210 extends vertically lower than the low resolution beam 205, i.e., lower edge of the high resolution beam 210 is lower than the lower edge of the low resolution beam 205.

The lighting system further comprises a leveling mechanism (not shown in the Figures) to adjust beam angular position of the low resolution in horizontal direction, i.e., along the horizontal line (H-H line) and/or in the vertical direction, i.e., along the vertical line (V-V line). The lighting system may further comprise a leveling mechanism (not shown in the Figures) to adjust beam angular position beam of the high resolution beam along the horizontal line (H-H line) and/or in the vertical direction, i.e., along the vertical line (V-V line). In another embodiment, the adjustment of the angular position of the high resolution beam according to the angular position of the low resolution beam is made by calibration, especially an electronic calibration, of the pixels corresponding to a given direction, without leveling mechanism. It allows to simplify the alignment of both beams and to avoid the extra-cost of a mechanical aiming.

In an embodiment, the low resolution beam presents a higher luminous intensity than the high resolution beam. For example, it is not expensive to create 120 Lux with matrix beam technology compared to DMD light technology. On the other hand, it is very expensive to create matrix beam module with high resolution and it is not very expensive to create a beam comprising a lot of pixels with DMD.

FIG. 3a and FIG. 3b shows schematic views of illumination regions formed by low and high resolution beams, according to an embodiment of the present invention.

FIG. 3a shows an example of light distribution pattern that is obtained by the at least one light emitting device configured to project a low resolution beam on the virtual vertical screen, disposed at the front of the vehicle. The screen is similar to the screen described in the context of FIG. 2a and FIG. 2b. In this example, low resolution beam is a matrix beam.

Reference number 305 in the FIG. 3a indicates the low resolution beam. In this example, low resolution beam 305 is a matrix beam, and segments of the beam are arranged in one row. Here, a hatched region 310 in the FIG. 3a represents a non-illumination region of the low resolution beam 305 that it is not illuminated with light, i.e., the control module 125 is operated to switch OFF the one or more low resolution segments. The region 315 other than the hatched region represents an illumination region of the low resolution beam 305 that is illuminated with light, i.e., the control module is operated to switch ON the one or more low resolution segments. Reference numeral 320 indicates a light, for example a headlamp or a rearlamp, of a preceding or incoming vehicle detected by the control module 125. The control module 125 may also be configured to detect the presence of a pedestrian, a preceding vehicle, or the like and controls the operation of the light sources mounted within the headlamps of the vehicle 100, thereby changes the light distribution pattern to suppress glare to the pedestrian, the preceding vehicle, or the like.

FIG. 3b shows an example of light distribution pattern that is obtained by combining the low resolution beam 305 (shown in dotted lines in FIG. 3b) and the high resolution beam (shown in solid lines in FIG. 3b) by projecting them on the virtual vertical screen, disposed at the front of the vehicle, for example at a distance of 25 meters from the front of the vehicle.

In an embodiment, whenever the control module 125 detects the presence of the pedestrian, the preceding vehicle or the like in front of the vehicle 100, the control module 125 is adapted to switch ON at least one pixel of the high resolution beam 325 inside an area corresponding to at least one switched OFF segment of the low resolution beam 305. This can be seen clearly from the FIG. 3b. In particular, reference numeral 330 indicates an area in which the at least one pixel of the high resolution beam 325 is switched ON inside the area corresponding to the at least one switched OFF segment of the low resolution beam 305, here in the region 310, to reduce the dark area that is created by switching OFF the one or more segments of the low resolution beam 305. Reference numeral 331 indicates an area in which both the high resolution beam and low resolution beam 305 are switched OFF to avoid glaring the other user. As it is visible on FIG. 3b, the remaining non-illuminated area 331 has a reduced size compared to the non-illuminated area 310 of the low resolution beam 305. It allows improving the lighting of the scene and still having non-glaring function. In this way, the lighting system of the present embodiment can suppress glare to the pedestrian, the preceding vehicle or the like by switching OFF the segments or pixels corresponding to the regions where the pedestrian, the preceding vehicle or the like which are detected by the vehicle information acquiring devices. On the other hand, the lighting of the scene is improved for the driver of the vehicle equipped with the light system according to the invention, as the illuminated portion of the scene is increased.

Further, it is noted from the FIG. 3b that the at least one switched ON pixel of the high resolution beam 325 is contiguous to or overlaps an edge of at least one switched ON segment of the low resolution beam 305 as it will be described in relation with FIGS. 3c, 3d and 3e which correspond to an enlarged view of the elements inside the circle on FIG. 3b, for three different embodiments. On these Figures, reference numeral 340 is an edge of a switched ON segment of the low resolution beam 305 that is a border between the illuminated region 315 and the non-illuminated region 310. On one side, there is a switched ON segment of the region 315. On the other side there is the switched OFF segment of the region 310.

In the embodiment of FIG. 3c, some switched ON pixels of high resolution beam are in the illuminated area 315 of low resolution beam 305 and some switched ON pixels of the high resolution bean are in the non-illuminated area 310 of low resolution beam 305. Some high resolution pixels have an edge that is at the same place as an edge 340 of low resolution segments.

In another embodiment shown in the FIG. 3d, some switched ON pixels of high resolution beam are in the illuminated area 315 of low resolution beam 305 and some switched ON pixels of the high resolution beam are in the non-illuminated area 310 of low resolution beam 305. In this embodiment, some high resolution pixels overlap the edge 340 of low resolution pixels. In this embodiment the high resolution pixels overlapping the edge 340 of low resolution pixels can be the only ones switched ON in the illuminated area 315 of low resolution beam 305. Alternatively, additional high resolution pixels may be illuminated in the illuminated area 315 of low resolution beam 305, and completely be included in this illuminated area 315.

Yet, in another embodiment, switched ON pixels of the high resolution beam are only in the non-illuminated area 310 of low resolution beam 305, as shown in the FIG. 3e. In this embodiment some high resolution pixels have an edge that is at the same place as an edge 340 of low resolution segments and no pixel of the high resolution beam is switched ON in the illuminated region 315 of the low resolution beam 305.

Although FIGS. 3c, 3d and 3e are described in relation with a specific example, it is clear that they apply to any kind of low resolution beam and high resolution beam, as long as these beams at least partially overlap.

According to another embodiment of the present invention, the first pixelated light beam 110 and the second pixelated light beam 120 are projected in such a way that they are disjointed from each other, i.e., the projected low resolution beam 405 and the high resolution beam 410 are disjointed from each other as can be seen from the FIG. 4. The projection of beams according to this embodiment facilitates in performing advancing lighting functions like suppressing the glare on one side and road surface drawing function on other side. For example, the road surface drawing functions include projecting in front of the vehicle at least one of images, patterns, logos, drawings, symbols, characters and/or like on a road surface.

In an embodiment, the high resolution beam 410 extends vertically lower than the low resolution beam 405. This type of projection of beams according this embodiment are adapted to perform glare free high beam on one side and road surface drawing function on other side. For example, low resolution beam 405 can be adapted to perform glare free function and the high resolution beam 410 can be adapted to perform road surface drawing functions.

In another embodiment, the low resolution beam 405 and the high resolution beam 410 are projected in such way that they are arranged laterally to each other. This type of projection of beams according this embodiment are adapted to perform high resolution road surface drawing function on one side and low resolution road surface drawing function on other side.

According to another embodiment, the present invention discloses an automotive vehicle 100 having a lighting system having at least one first light emitting device and at least one second light emitting device to produce low resolution beam and the high resolution beam.

Thus, the present invention provides a lighting system that can project two different pixelated light beams having different resolutions to reduce the cost and power consumption, while achieving the required luminous intensity for the vehicle.

What is claimed is:

1. A Lighting system of a motor vehicle comprising:
   at least one first light emitting device adapted to be mounted on a front right side of the vehicle and adapted to project in front of the vehicle a first pixelated light beam;
   at least one second light emitting device adapted to be mounted on a front left side of the vehicle and adapted to project in front of the vehicle a second pixelated light beam; and
   a control module for the at least one first light emitting device and the at least second light emitting device, adapted to selectively control the switching ON and OFF of the pixels of the first pixelated light beam and the second pixelated light beam,
   wherein one of the first pixelated light beam and second pixelated light beam, called high resolution beam, has a number of pixels greater than or equal to at least three times the number of pixels of the other of said pixelated light beams, called low resolution beam.

2. The lighting system according to claim 1, wherein the high resolution beam, has a number of pixels greater than or equal to at least ten times, the number of pixels of the low resolution beam.

3. The lighting system according to claim 1, wherein only a light emitting device adapted to project the high resolution beam on one side and no light emitting device adapted to project the low resolution beam on the same side, and only a light emitting device adapted to project the low resolution beam on the other side and no light emitting device adapted to project the high resolution beam on this same side.

4. The lighting system according to claim 1, wherein the low resolution beam covers a larger luminous field than the high resolution beam.

5. The lighting system according claim 1, wherein the low resolution beam extends horizontally over a wider angular field than the high resolution beam.

6. The lighting system according to claim 1, wherein the low resolution beam extends vertically higher than the high resolution beam.

7. The lighting system according to claim 1, wherein the high resolution beam extends vertically lower than the low resolution beam.

8. The lighting system according to claim 1, wherein the low resolution beam presents a higher maximum luminous intensity than the high resolution beam.

9. The lighting system according to claim 1, wherein the first pixelated light beam and the second pixelated light beam overlap at least partially.

10. The lighting system according to claim 1, wherein the control module is adapted to switch ON at least one pixel of the high resolution beam inside an area corresponding to at least one switched OFF pixel of the low resolution beam.

11. The lighting system according to claim 1, wherein the first light emitting device and the second light emitting device are adapted to project in front of the vehicle a dark area corresponding to a vehicle, pedestrian or like coming from the front.

12. The lighting system according to claim 1, wherein the first pixelated light beam and the second pixelated light beam are disjointed and non-overlapping from each other.

13. The lighting system according to claim 12, wherein a lower limit of the high resolution beam extends vertically lower than a lower limit of the low resolution beam.

14. The lighting system according to claim 1, wherein the high resolution beam and the low resolution beam are arranged laterally and non-overlapping to each other.

15. The lighting system according to claim 1, wherein the first light emitting device and the second light emitting device are adapted to project in front of the vehicle to project at least one of images, patterns, logos, drawings, symbols, characters and/or like on a road surface.

16. The lighting system according to claim 1, wherein the light emitting device adapted to project in front of the vehicle the low resolution beam is mounted on the same side of the vehicle where a steering wheel is located, and the light emitting device adapted to project in front of the vehicle the high resolution beam is mounted on the other side of the vehicle.

17. An Automotive vehicle, comprising:
   a lighting system, the lighting system including,
      at least one first light emitting device adapted to be mounted on a front right side of the vehicle and adapted to project in front of the vehicle a first pixelated light beam; and
      at least one second light emitting device adapted to be mounted on a front left side of the vehicle and adapted to project in front of the vehicle a second pixelated light beam; and
      a control module for the at least one first light emitting device and the at least second light emitting device, adapted to selectively control the switching ON and OFF of the pixels of the first pixelated light beam and the second pixelated light beam,
   wherein one of the first pixelated light beam and second pixelated light beam, called high resolution beam, has a number of pixels greater than or equal to at least three times the number of pixels of the other of said pixelated light beams, called low resolution beam.

18. The Automotive vehicle according to claim 17, wherein the light emitting device adapted to project in front of the vehicle the low resolution beam is mounted on the same side of the vehicle where a steering wheel is located, and the light emitting device adapted to project in front of the vehicle the high resolution beam is mounted on the other side of the vehicle.

19. A Lighting system of a motor vehicle comprising:
at least one first light emitting device adapted to be mounted on a front right side of the vehicle and adapted to project in front of the vehicle a first pixelated light beam;
at least one second light emitting device adapted to be mounted on a front left side of the vehicle and adapted to project in front of the vehicle a second pixelated light beam;
wherein one of the first pixelated light beam and second pixelated light beam, called high resolution beam, has a number of pixels greater than or equal to at least three times the number of pixels of the other of said pixelated light beams, called low resolution beam, with only a light emitting device adapted to project the high resolution beam on one side and no light emitting device adapted to project the low resolution beam on the same side, and only a light emitting device adapted to project the low resolution beam on the other side and no light emitting device adapted to project the high resolution beam on this same other side.

* * * * *